(12) United States Patent
McWilliams

(10) Patent No.: US 6,603,602 B1
(45) Date of Patent: Aug. 5, 2003

(54) PORTABLE TELESCOPE MOUNT WITH INTEGRAL LOCATOR USING MAGNETIC ENCODERS FOR FACILITATING LOCATION OF OBJECTS AND POSITIONING OF A TELESCOPE

(75) Inventor: Rick McWilliams, Ventura, CA (US)

(73) Assignee: Bushnell Corporation, Overland Park, KS (US)

( * ) Notice: Subject to any disclaimer, the term of this patent is extended or adjusted under 35 U.S.C. 154(b) by 28 days.

(21) Appl. No.: 09/780,822

(22) Filed: Feb. 9, 2001

(51) Int. Cl.[7] .............................. G02B 23/00
(52) U.S. Cl. .................. 359/430; 359/399; 359/429
(58) Field of Search ................. 359/362–363, 359/399, 405, 430, 429; 250/203.1–203.6; 340/815.4, 999; 318/626, 652, 286, 406

(56) References Cited

U.S. PATENT DOCUMENTS

| | | | | |
|---|---|---|---|---|
| 4,142,139 A | * | 2/1979 | Slaats et al. ................ 318/603 |
| 4,682,091 A | * | 7/1987 | Krewalk et al. ............. 359/430 |
| 4,764,881 A | * | 8/1988 | Gagnon ....................... 364/559 |
| 5,757,180 A | * | 5/1998 | Chou et al. ................ 324/207.2 |
| 6,093,928 A | * | 7/2000 | Ohtomo et al. .......... 250/231.13 |
| 6,304,376 B1 | * | 10/2001 | Baun et al. .................. 359/429 |
| 6,366,212 B1 | * | 4/2002 | Lemp ....................... 340/815.4 |
| 6,422,012 B1 | * | 7/2002 | Bassett .......................... 60/528 |

* cited by examiner

Primary Examiner—Thong Nguyen
(74) Attorney, Agent, or Firm—Hovey Williams LLP

(57) ABSTRACT

A portable altitude/azimuth telescope mount having an integral locator system with a magnetic encoder mechanism for facilitating location of astronomical objects and telescope positioning for observation thereof. A microprocessor receives signals from the encoder mechanism and translates such into position data for display. The locator system also includes a database of astronomical objects, including their locations and other relevant information.

15 Claims, 4 Drawing Sheets

PORTABLE TELESCOPE MOUNT WITH INTEGRAL LOCATOR USING MAGNETIC ENCODERS FOR FACILITATING LOCATION OF OBJECTS AND POSITIONING OF A TELESCOPE

COMPUTER PROGRAM LISTING APPENDIX

A computer program listing appendix containing the source code of a computer program that may be used with the present invention is incorporated herein by reference and appended hereto as one (1) original compact disk, and an identical copy thereof, containing a total of two (2) files as follows:

| Filename | Date of Creation | Size (Bytes) |
| --- | --- | --- |
| INTSF3.TXT | Feb. 9, 2001 1:53 p | 107,970 |
| SF3.TXT | Feb. 9, 2001 1:53 p | 387,385 |

BACKGROUND OF THE INVENTION

1. Field of the Invention

The present invention relates to telescopes, telescope mounts, and astronomical object locators. More particularly, the present invention relates to an altitude/azimuth telescope mount having an integral locator using magnetic encoders and a microprocessor for facilitating location of astronomical objects and telescope positioning for efficient and convenient observation of the objects.

2. Description of the Prior Art

Astronomers have long desired, and telescope manufacturers have long striven to develop, an effective but easy-to-use locator system for quickly and reliably locating astronomical objects and efficiently positioning a telescope for making observations thereof. The positions of astronomical objects are based upon a spherical coordinate system involving the perpendicular axes of right ascension and declination, determination of which requires a theodolite, a clock, and an accurate knowledge of the observer's latitude and longitude. The theodolite is used to measure the object's angle above the local horizon; the object's declination is then calculated to be the angle between the Celestial Equatorial Plane (CEP) and the North Celestial Pole (NCP). An arbitrary 0° longitudinal line has been defined as a line engraved on a brass plate set in the floor of the Old Royal Observatory in Greenwich, England.

The object's right ascension requires a knowledge of the Local Sidereal Time, being based upon the moment of Local Sidereal Time the object transits the observer's zenith, or local meridian. Because the Earth makes one full turn about its polar axis every twenty-four hours, right ascension is traditionally referred to in hours, from zero to twenty-four. Note, however, that right ascension is easily converted to degrees, with one hour of right ascension equaling 15°, or ¹⁄₂₄ of a 360° circle. Hours are further divided into finer units of 60 arcminutes, written 60', or 3600 arcseconds, written 60". A good telescope under good observing conditions can resolve details as fine as 1" on the surface of the celestial sphere.

Having successfully mastered the complex spherical coordinate system, an astronomer is not yet ready to begin observation. Because the Earth's axis of rotation moves, causing the coordinate grid to shift, an object's right ascension and declination are continually changing. Thus, an object's precise position is date dependent, with the current standard being equinox 2000.0, which means the object's right ascension and declination at the moment the year 2000 began. For example, the star Vega (Alpha Lyra) currently may be found at approximately 18 h 37 m right ascension, and approximately +38 47' declination.

As can be appreciated, locating astronomical objects and positioning a telescope for observation can be a difficult, frustrating, and time consuming process. Furthermore, once the telescope has been repositioned to observe a second object, a large part of the process must be inefficiently and inconveniently repeated to reacquire the first object.

Large institutional telescopes can be cost effectively equipped with computer-controlled automatic locator systems requiring only that the desired object's right ascension and declination or its name or designation be entered, from which the computer can retrieve positioning data from a comprehensive database. Along with the time, date, and a knowledge of the fixed latitude and longitude of the observatory, the controlling computer can use drive motors to automatically position the telescope with positive feedback data provided by mechanical encoders.

Unfortunately, such automated systems are too expensive and cumbersome for use on small, portable telescopes. For example, common optical encoders for position determination are too expensive or use impractically complex or heavy mechanical gears or similar mechanisms. Furthermore, results of attempts to create a practical and economically feasible portable automated locator system for small telescopes have typically been sorely lacking in accuracy. Adding to the difficulty is the need to reduce weight and power consumption in order to preserve the portable nature of the telescope.

Due to these and other problems in the art, a need exists for an improved locator system.

SUMMARY OF THE INVENTION

The locator system of the present invention includes unique features that solve the above-identified and other problems by integrating the locator with the telescope mount in order to reduce weight and cost, and using magnetic encoders and a microprocessor to locate objects and provide position data with the degree of precision and accuracy necessary for many applications, including high magnification observation and astrophotography.

The mount is a portable azimuth-altitude mount providing two corresponding axes of rotation, with each axis having an associated encoder detecting and measuring movement of the telescope about the axis. Each encoder includes a ring of low cost ceramic permanently magnetic material suspended in a plastic matrix and presenting a plurality of poles, and a detector having a Hall-effect sensor operable to detect movement of the magnetic poles and to generate electrical data signals representative thereof. The microprocessor receives the data signals and translates them into position data for presentation via a display.

An advantage of the locator system is that no complex configuration process or calculations need be performed prior to or during use. Instead, the telescope need only be aligned with one or more reference objects whose positions are known to the microprocessor and based upon which the relative positions of other objects may be calculated. Another advantage of the system is that the microprocessor includes a catalog or database of objects and their positions, which can be recalled and displayed for the user. Yet another advantage of the locator system is that encoder data is translated into current position data which can be displayed, and which can be stored in the microprocessor's memory. Thus, a user desiring to observe an object need only move the telescope until the displayed current position data matches the desired position data, thereby eliminating the inefficiency and inconvenience of having to determine or re-determine the object's position based upon complex calculations.

These and other advantages of the present invention are further described in the section entitled DETAILED DESCRIPTION OF A PREFERRED EMBODIMENT, below.

BRIEF DESCRIPTION OF THE DRAWING FIGURES

A preferred embodiment of the present invention is described in detail below with reference to the attached drawing figures, wherein.

DETAILED DESCRIPTION OF A PREFERRED EMBODIMENT

Figure 1:
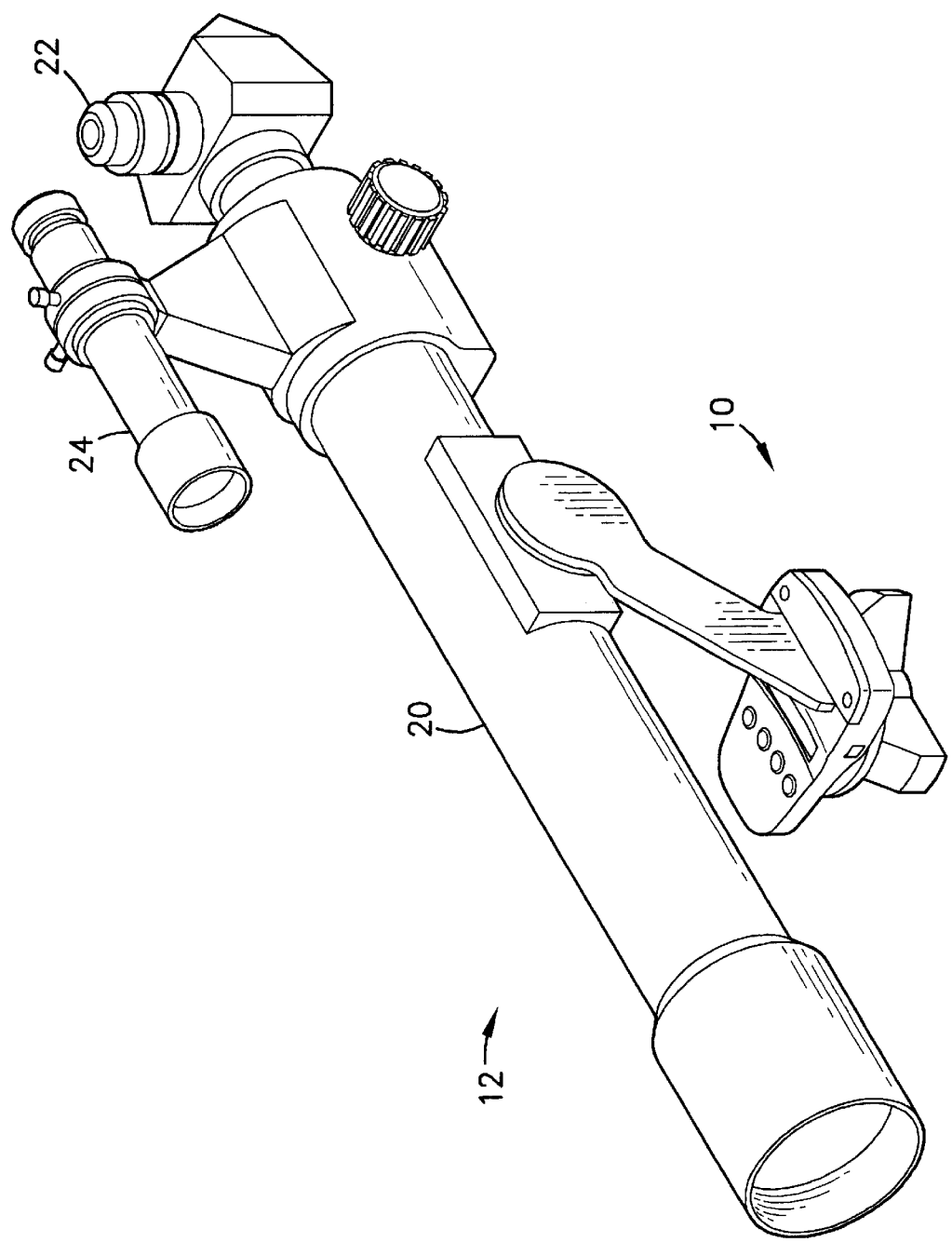
FIG. 1 is a first isometric view of a mount constructed in accordance with a preferred embodiment of the present invention, with the mount shown supporting a telescope.
Figure 2:
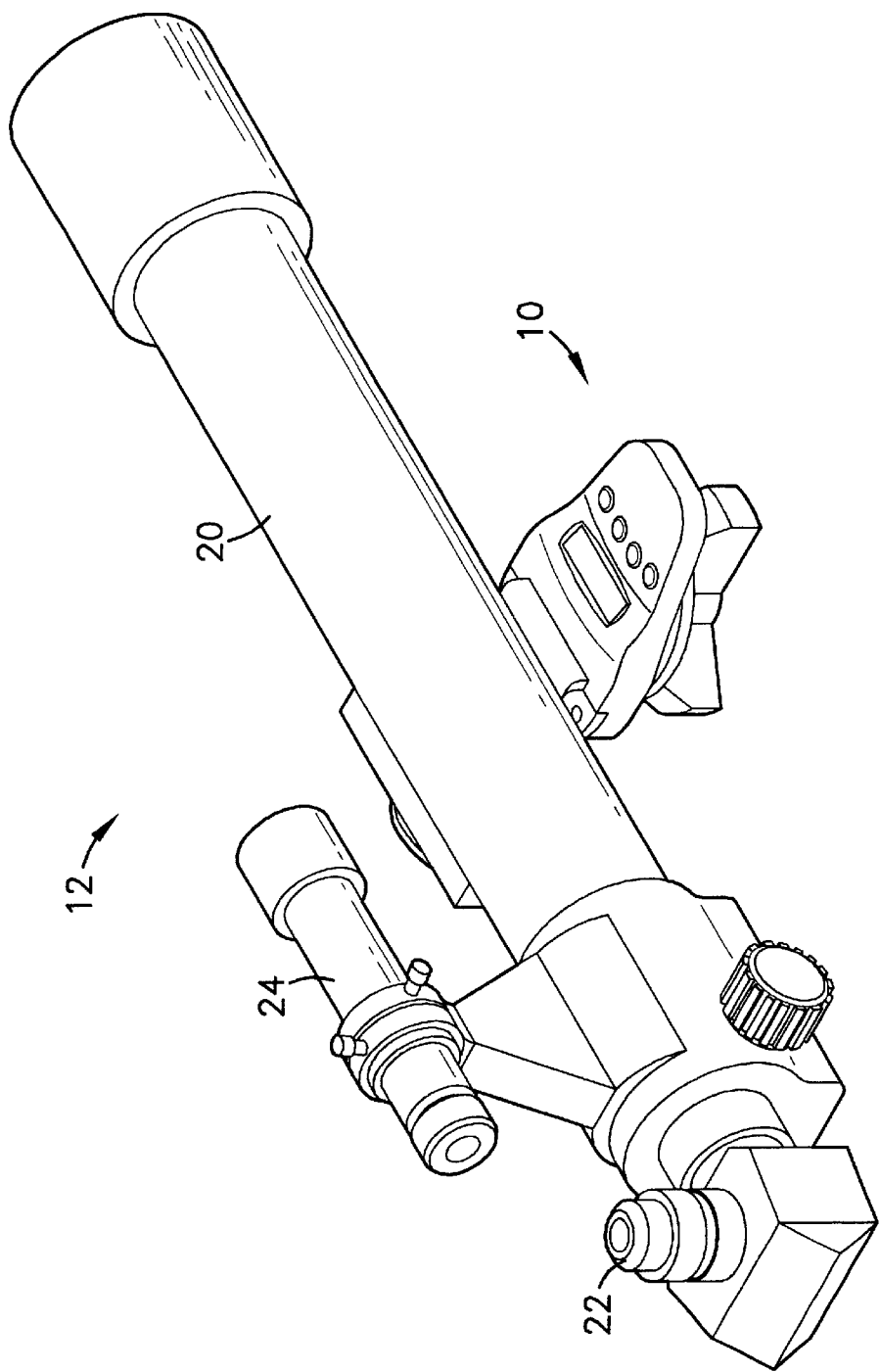
FIG. 2 is a second isometric view of the embodiment shown in FIG. 1.

Referring to FIGS. 1 and 2, a preferred altitude/azimuth telescope mount 10 is shown operable to portably support a telescope 12 and facilitate location of astronomical objects and telescope positioning for efficient and convenient observation of the objects. The mount 10 includes an integral locator system providing efficient microprocessor-assisted object location and telescope positioning with the necessary degree of precision and accuracy for most, if not all, observation purposes, including high magnification or deep sky/faint object observations and astrophotography.

The telescope 12 is a refractor-type telescope broadly comprising a tube 20 for housing optics; an eyepiece 22 coupled with the tube 20 and operable to facilitate observation of telescopically magnified images; and a sighting scope 24 coupled to the tube and having a wide field of view for facilitating rough positioning of the telescope for observation of an astronomical object. It should be noted that the mount 10 of the present invention is independent of any particular telescope or telescope type, including the telescope 12 shown for illustrative purposes only.

Figure 3:
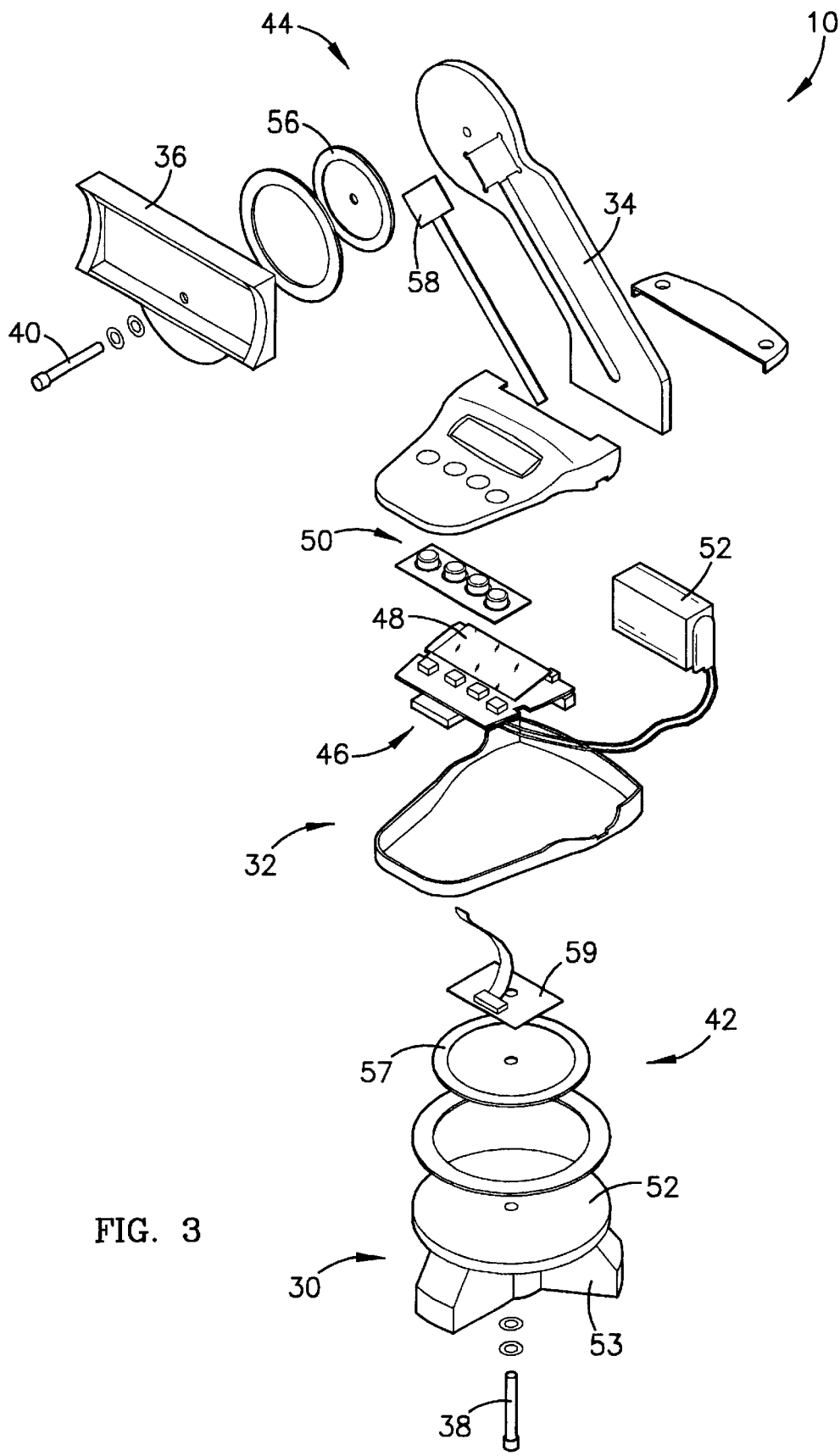
FIG. 3 is an exploded view of a preferred embodiment of the present invention.

Referring also to FIG. 3, the mount 10 includes a base 30; a main housing 32; a support arm 34; a support structure 36; first and second axis shafts 38,40; first and second magnetic encoders 42,44; a microprocessor 46; a display 48; input buttons 50; and a power source 52.

The base 30 provides a support and primary mounting structure for the remaining components of the mount 10. The base 30 presents top and bottom portions 52,53, and is preferably made of a suitably strong and durable material such as wood, plastic, or lightweight metal. The top portion presents a flat surface for accommodating rotation of the main housing 32 and other components of the mount 10. The bottom portion 53 is adapted to receive and couple with three or more independently adjustable legs (not shown) to form a stable tripod (or other) arrangement.

The main housing 32 supports, encloses, and protects from the elements more sensitive components of the mount 10, including the microprocessor 46 and display 48. The housing 32 is preferably made of a strong, durable, and lightweight material such as plastic or fiberglass. The housing also securely couples with and provides a stable base for the support arm 34.

The support arm 34 projects upwardly from the housing 32 to couple with the support structure 36 which, in turn, securely couples with the telescope 12. The arm 34 is also made of a strong, durable, and lightweight material such as plastic or fiberglass able to safely support the weight of the telescope 12. The support structure 36 securely couples the mount 10 with the telescope tube 20. As will be appreciated by those with skill in the mechanical arts, and as is contemplated by the present invention, a variety of alternative coupling mechanisms and schemes may be satisfactorily employed for this purpose.

The first and second axis shafts 38,40 provide pivot points allowing the telescope 12 to be freely positioned for observation. The first axis shaft 38 corresponds to an azimuth axis which allows for rotation parallel with the ground. The first shaft 38 couples the base 30 with the housing 32 such that the housing 32 may rotate freely over the top portion 52 of the stationary base 30. The second axis shaft 40 corresponds to an altitude axis which allows for rotation perpendicular to the ground. The second shaft 40 couples the support arm 34 with the support structure 36.

The first and second magnetic encoders 42,44 are substantially identical and correspond, respectively, to the azimuth and altitude axes, and are operable to generate signals in response to and representing movement of the telescope tube 20 about these axes. The design of the encoders 42,44 is unique in that is allows for very high resolution and accurate position measurement using inexpensive parts and materials. Resolution of the preferred encoder 42,44 is 0.1° per step, or 3600 steps, slew rate is 100° per second, angle representation is 16 bits, and vector representation is 48 bits. Each encoder 42,44 broadly comprises one or more magnetic field generators 56,57 and one or more associated magnetic field detectors 58,59.

Figure 4:
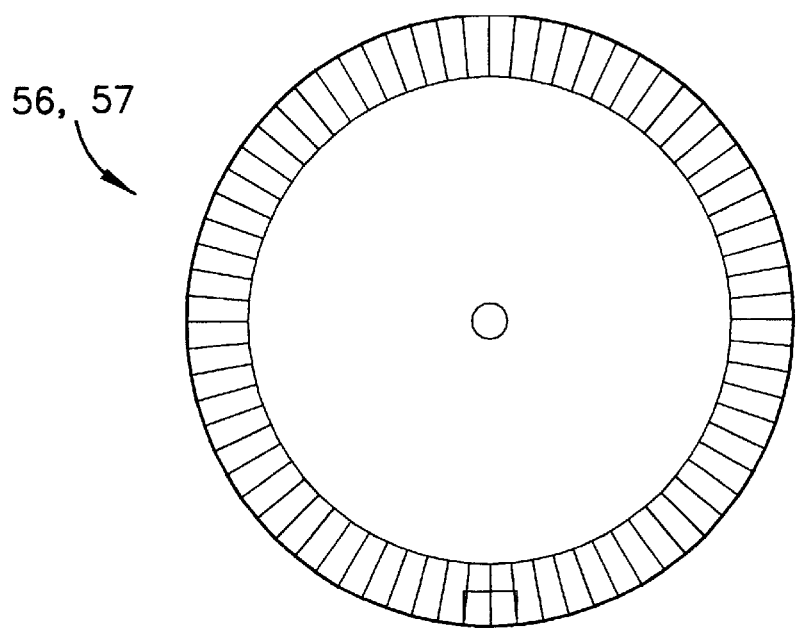
FIG. 4 is a representation of a component of a preferred embodiment of the magnetic encoder portion of the present invention.
Figure 5:
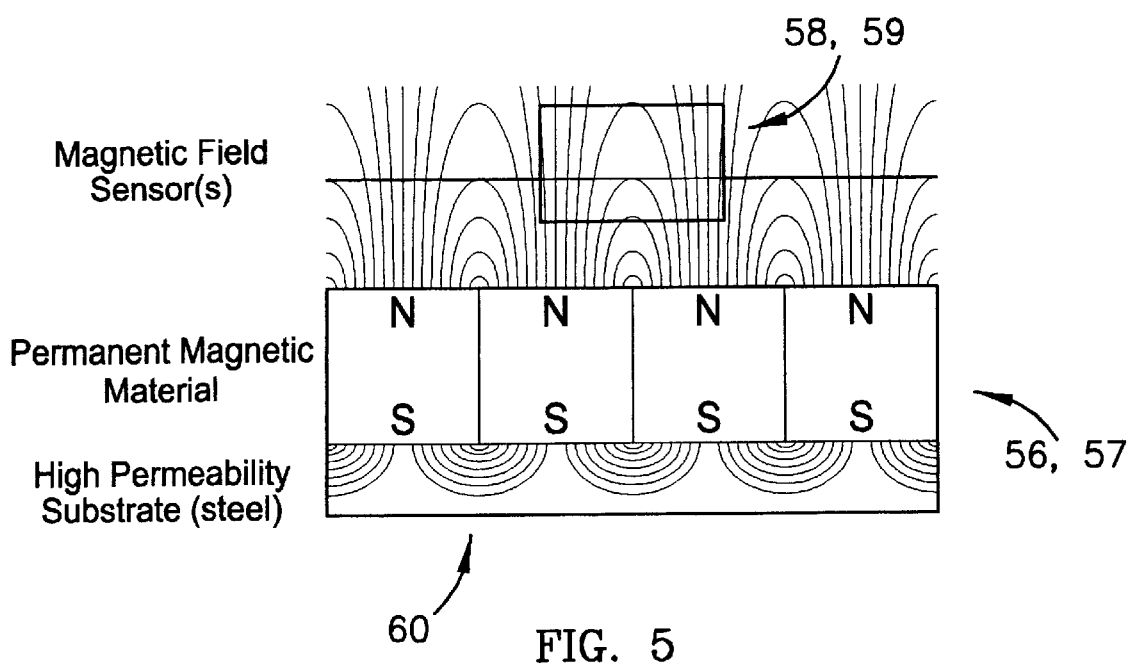
FIG. 5 is a representation of the structural and operational relationship between components of a preferred embodiment of the magnetic encoder portion of the present invention.

Referring also to FIGS. 4 and 5, each magnetic field generator 56,57 comprises a ring of low cost ceramic permanently magnetic material suspended in a plastic matrix and applied to a dimensionally stable backing. The backing material provides additional dimensional stability. The magnetic ring of high-strength magnetic material is magnetized to a high degree of concentricity with a radial pattern of relatively coarse poles to provide a strong magnetic field extending well beyond the magnetic material. The coarse pitch of the magnetic pattern allows the detector 58,59 to be positioned well above or below the magnetic material's surface. But note: This separation distance is not critical and only affects accuracy if it changes. Use of low cost ceramic magnetic materials in a plastic matrix are suitable because detector 58,59 resolution is not degraded by magnetic grain irregularities in the magnetic material because the irregularities are smoothed by the behavior of the magnetic field in the separation space between the magnetic field generating material 56,57 and the detector 58,59.

Each detector 58,59 preferably includes a conventional ratiometric, linear Hall-effect sensor providing a voltage output signal proportional to an applied magnetic field and having a quiescent (no applied magnetic field) output voltage that is approximately 50% of the. supply voltage. Such a sensor is commonly used, for example, in linear and rotary position sensing systems of automobiles. The Hall-effect sensors may be one or two axis sensors, and may be laterally shifted to provide convenient sensing directions. Furthermore, two or more single axis sensors may be used to provide quadrature or three-phase angle information, in which case magnetic field position is determined as a function of the inverse tangent of the angle between sensors.

It is further preferred that each detector 58,59 be a BiCMOS monolithic circuit incorporating the described Hall-effect sensor, circuitry for temperature compensation to reduce the intrinsic sensitivity drift of the Hall-effect sensor, a small signal high-gain amplifier to amplify the generated output signal, and a rail-to-rail low-impedance output stage. Such detector circuits are available, for example, from Allegro Microsystems, Inc., as part numbers A3517SUA and A3518SUA.

Application of a magnetic field perpendicular to the detector 58,59, whether north or south pole, will increase or decrease the output voltage from its quiescent value toward the supply voltage rail by an amount proportional to the applied magnetic field. As will be appreciated by one with skill in the electrical arts, the stability of Hall-effect sensor sensitivity is a function of temperature, ergo the temperature compensating circuitry of the preferred detector. As the magnetic material is moved relative to the sensor, the magnetic field is perceived to rotate a full circle for each North-South pole pair. The angle of this field provides a finely resolved absolute position within the polar pair. Large angle measurements count pole pairs and then add any fractional part. Also, because position within a pole pair is absolute, small errors due to sensor location, angle, or sensitivity are periodic and can be corrected electronically.

A high permeability material 60, such as a steel baking sheet, can be included to provide shielding from the influences and effects of external magnetic fields. Also, because detector output signals may be analog in nature, an analog-to-digital (A/D) converter (not shown) may be interposed as necessary in over to digitize the output signals for use by the microprocessor 46.

The microprocessor 46 is operable to translate data signals generated by the encoders 42,44 into position data that can be used to aim or steer the telescope and facilitate location and observation of astronomical objects. In order to perform this function, the microprocessor 46 must have access to various variables, including geographical location (latitude and longitude), time, and date. The present invention is able to determine these values automatically and does not require the user to know or input such. Rather, the mount is initially configured by aligning the telescope with one or more reference objects from which the relative locations of other objects may be calculated. The microprocessor 46 preferably includes an internal sidereal clock having an accuracy of 0.01%.

A computer program listing appendix is appended hereto setting forth a preferred embodiment of computer code that may be stored within the microprocessor 46, or a memory (not shown) associated therewith, and executed by the microprocessor 46 to accomplish translation of the encoder signals as well as the features and functions described below.

The microprocessor 46 includes a number of features and functions, including CATALOG; STAR FIX; ALIGN; RADEC; GUIDE; SETUP; and ENCODER. CATALOG provides a complete database of 110 Messier objects, an abbreviated list of 30 alignment stars, a catalog of 60 interesting stars and double stars, and a list of all 9 solar planets. For all databased objects, the catalog includes position data and descriptions, including magnitude, constellation, size, separation, and type, as may be applicable. Initial configuration of the mount requires two star alignment and orthogonal positioning of the encoder axes. No latitude, longitude, date, or time inputs are required. STAR FIX is an alignment mode using the databased list of thirty conveniently spotted stars. ALIGN is an alignment mode that uses the complete database of objects.

RADEC provides right ascension and declination from position data. GUIDE displays aiming or steering coordinates to a selected or indicated next object. SETUP is a telescope installation and setup guide. ENCODER displays encoder angles.

The display 48 provides a visual interface between user and microprocessor 46 and facilitates communication therebetween. The display 48 is preferably a light emitting diode (LED) display or liquid crystal display (LCD) or other similarly suitable device. Furthermore, display brightness is preferably variable, from dim to full, which allows for both reduced power consumption and reduced interfering light pollution, as desired. The input buttons 50 provide an interface between user and microprocessor 46 whereby user input may be provided to the microprocessor 46, possibly in response to prompts communicated via the display 48.

The power supply 52 provides power to the microprocessor 46, display 48, and other powered components of the system 10. The supply 52 is preferably one or more batteries so as to be portable and suited to field work, though an optional power connection point and adaptor (not shown) may be included for use where an AC outlet is available. Power requirements of the herein described embodiment are 5.1 to 14 volts DC, drawing 14 to 50 mA depending upon configuration and display brightness. A preferred power source is a single nine volt alkaline battery, which should provide approximately thirty hours of battery life with the display 48 fully dimmed.

Though not shown, a network connection point may be provided to allow the microprocessor to access a network, such as the Internet. This ability allows for such functions as updating the microprocessor's database; re-calibrating the microprocessor, possibly including the internal sidereal clock; and remote diagnosis and troubleshooting.

In operation, the SETUP function of the microprocessor 46 can be used to ensure complete and proper hardware assembly, including coupling the telescope 12 with the structural support component 36 of the mount 10. Assuming such assembly, a user must next configure the mount using either the STAR FIX or ALIGN functions to identify one or more reference objects upon whose location subsequent position data will be based.

The user may then select the GUIDE function to cause position data to be displayed of a selected or indicated object. Objects may be selected from the CATALOG feature, or user-stored position data may be recalled from the microprocessor's memory. Using the ENCODER function to display current position data, with such displayed data changing as the telescope tube 20 moves about the axes, the user can easily and conveniently re-position or steer the telescope until the desired position and the displayed current position match. Furthermore, if an object is located that does not appear in the CATALOG database, the user may save the position coordinates in the microprocessor's memory for subsequent recall and display.

From the preceding description, it can be understood that the portable telescope mount 10 of the present invention is able, using the magnetic encoders 42,44 and the microprocessor 46, to efficiently and conveniently facilitate location of astronomical objects and positioning of the telescope 12 for observation. Although the invention has been described with reference to the preferred embodiment illustrated in the attached drawings, it is noted that equivalents may be employed and substitutions made herein without departing from the scope of the invention as recited in the claims. Those skilled in the relevant arts will appreciate, for example, that the telescope mount 10 is independent of any particular telescope or telescope type, whether refractor, reflector, Cassegrain, or other.

Having thus described the preferred embodiment of the invention, what is claimed as new and desired to be protected by Letters Patent includes the following:

1. A telescope mount for facilitating location of astronomical objects and positioning of a portable telescope movable along an axis, the telescope mount comprising:
   an axial shaft defining the axis and coupling the telescope with the telescope mount;
   an encoder, including a magnet and a magnetic field detector, operably associated with the axial shaft to generate a signal corresponding to movement of the magnet relative to the magnetic field detector resulting from movement of the telescope about the axis;
   a microprocessor operable to translate the signal into a set of current position data; and
   a display operable to communicate the set of current position data.

2. The telescope mount as set forth in claim 1, further including a memory associated with the microprocessor and operable to store a plurality of position data sets for use by the microprocessor.

3. The telescope mount as set forth in claim 2, the memory being further operable to store a database of known position data sets for a plurality of astronomical objects.

4. The telescope mount as set forth in claim 1, the magnet being a ring of permanently magnetized ceramic material presenting a plurality of pole pairs.

5. The telescope mount as set forth in claim 1, the magnetic field detector being a Hall-effect sensor.

6. A portable telescope mount for facilitating location of astronomical objects and positioning of a portable telescope movable along a first axis and a second axis, the telescope mount comprising:
   a first axial shaft defining the first axis and coupling the telescope with the telescope mount;
   a second axial shaft defining the second axis;
   a first encoder, including a first magnet and a first magnetic field detector, operably associated with the first axial shaft to generate a first data signal corresponding to movement of the first magnet relative to the first magnetic field detector resulting from movement of the telescope about the first axis;
   a second encoder, including a second magnet and a second magnetic field detector, operably associated with the second axial shaft to generate a second data signal corresponding to movement of the second magnet relative to the second magnetic field detector resulting from movement of the telescope about the second axis;
   a controller comprising
      a microprocessor operable to translate the first and second data signals into a set of current position coordinates, and
      a memory operable to store a plurality of position data sets for use by the microprocessor; and
   a display operable to communicate the set of current position data.

7. The telescope mount as set forth in claim 6, the memory being further operable to store a database of known position data sets for a plurality of astronomical objects.

8. The telescope mount as set forth in claim 6, the magnet being a ring of permanently magnetized ceramic material presenting a plurality of pole pairs.

9. The telescope mount as set forth in claim 6, the magnetic field detector including a Hall-effect sensor.

10. The telescope mount as set forth in claim 6, wherein the first axis is an azimuth axis and the second axis is an altitude axis perpendicular to the azimuth axis.

11. A portable telescope mount for supporting a portable telescope and facilitating location of astronomical objects and positioning of the telescope for observation, the telescope being movable along an azimuth axis and an altitude axis, the portable telescope mount comprising:
   a base having a top and bottom;
   a weatherproof housing coupled with the top of the base;
   a support structure uprightly coupled with the weatherproof housing;
   an azimuth axial shaft defining the azimuth axis, and coupling the telescope with support structure;
   an altitude axial shaft defining the altitude axis perpendicular to the azimuth axis, and coupling the weatherproof housing with the base;
   a first encoder, including a first magnet and a first magnetic field detector, operably associated with the azimuth axial shaft to generate a first data signal corresponding to movement of the first magnet relative to the first magnetic field detector resulting from movement of the telescope about the azimuth axis;
   a second encoder, including a second magnet and a second magnetic field detector, operably associated with the altitude axial shaft to generate a second data signal corresponding to movement of the second magnet relative to the second magnetic field detector resulting from movement of the telescope about the altitude axis;
   a controller located within the weatherproof housing and comprising
      a microprocessor operable to translate the first and second data signals into a set of current position data, and
      a memory operable to store a plurality of position data sets for use by the microprocessor; and
   a display mounted upon the weatherproof housing operable to communicate the set of current position data.

12. The portable telescope mount as set forth in claim 11, the memory being further operable to store a database of known position data sets for a plurality of astronomical objects.

13. The portable telescope mount as set forth in claim 11, the magnet being a ring of permanently magnetized ceramic material presenting a plurality of pole pairs.

14. The portable telescope mount as set forth in claim 11, the magnetic field detector including a Hall-effect sensor.

15. A telescope mount for facilitating location of astronomical objects and positioning of a portable telescope movable along an axis, the telescope mount comprising:
   an axial shaft defining the axis and coupling the telescope with the telescope mount;
   an encoder, including a magnet and a magnetic field detector, operably associated with the axial shaft to generate a signal corresponding to movement of the magnet relative to the magnetic field detector resulting from movement of the telescope about the axis;

a microprocessor adapted to translate the signal into a set of current position data based upon a set of reference position data, wherein the set of reference position data is based upon an initial calibration of the telescope mount involving alignment of the telescope with at least two of the astronomical objects; and a display operable to communicate the set of current position data.

* * * * *